United States Patent
Sadwick

(10) Patent No.: US 9,560,718 B2
(45) Date of Patent: Jan. 31, 2017

(54) DIMMER WITH MOTION AND LIGHT SENSING

(71) Applicant: Laurence P. Sadwick, Salt Lake City, UT (US)

(72) Inventor: Laurence P. Sadwick, Salt Lake City, UT (US)

( * ) Notice: Subject to any disclaimer, the term of this patent is extended or adjusted under 35 U.S.C. 154(b) by 0 days.

(21) Appl. No.: 14/071,345

(22) Filed: Nov. 4, 2013

(65) Prior Publication Data

US 2014/0125234 A1    May 8, 2014

Related U.S. Application Data

(60) Provisional application No. 61/721,601, filed on Nov. 2, 2012.

(51) Int. Cl.
H05B 37/02 (2006.01)

(52) U.S. Cl.
CPC ...... *H05B 37/0218* (2013.01); *H05B 37/0227* (2013.01); *Y02B 20/46* (2013.01)

(58) Field of Classification Search
CPC .... H05B 39/042; H05B 41/3422; Y02B 20/14

USPC .......................................... 315/158, 151, 291
See application file for complete search history.

(56) References Cited

U.S. PATENT DOCUMENTS

| | | | |
|---|---|---|---|
| 5,128,595 A * | 7/1992 | Hara | 315/312 |
| 5,747,937 A * | 5/1998 | Wiesemann et al. | 315/159 |
| 6,218,787 B1 * | 4/2001 | Murcko | H05B 37/0263 315/194 |
| 6,407,515 B1 * | 6/2002 | Hesler et al. | 315/294 |
| 2006/0071610 A1 * | 4/2006 | Dluzniak | 315/209 R |

* cited by examiner

*Primary Examiner* — Dylan White

(57) ABSTRACT

A dimming system includes an alternating current input, a reference crossing detector operable to detect when a signal derived from the alternating current input crosses a reference level, a ramp signal generator operable to generate a ramp signal with a changing voltage, wherein the ramp signal generator is operable to restart the ramp signal based on an output of the reference crossing detector, a switch operable to control a current derived from the alternating current input to a load output, a switch driver operable to control the switch based at least in part on the ramp signal, and a difference amplifier operable to generate a difference between the ramp signal and an input from a light sensor, wherein the switch driver is operable to control the switch based at least in part on the difference.

19 Claims, 3 Drawing Sheets

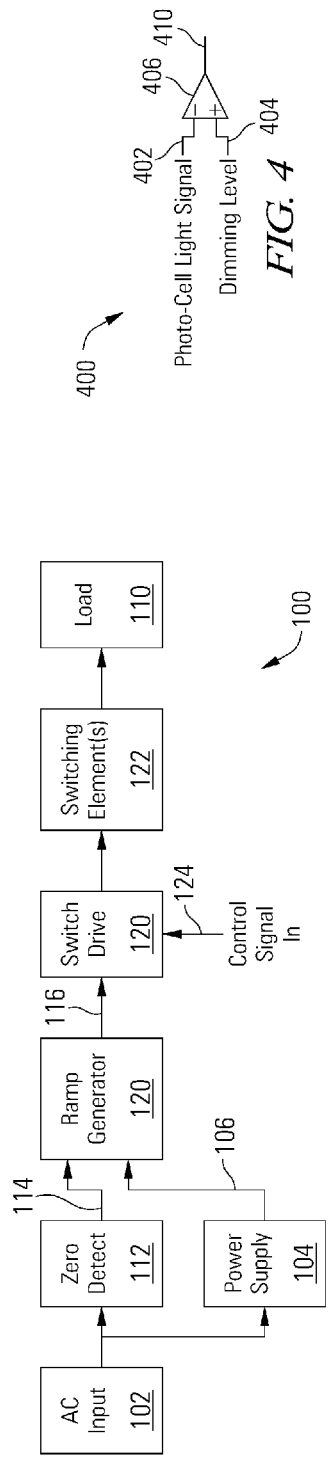
FIG. 1
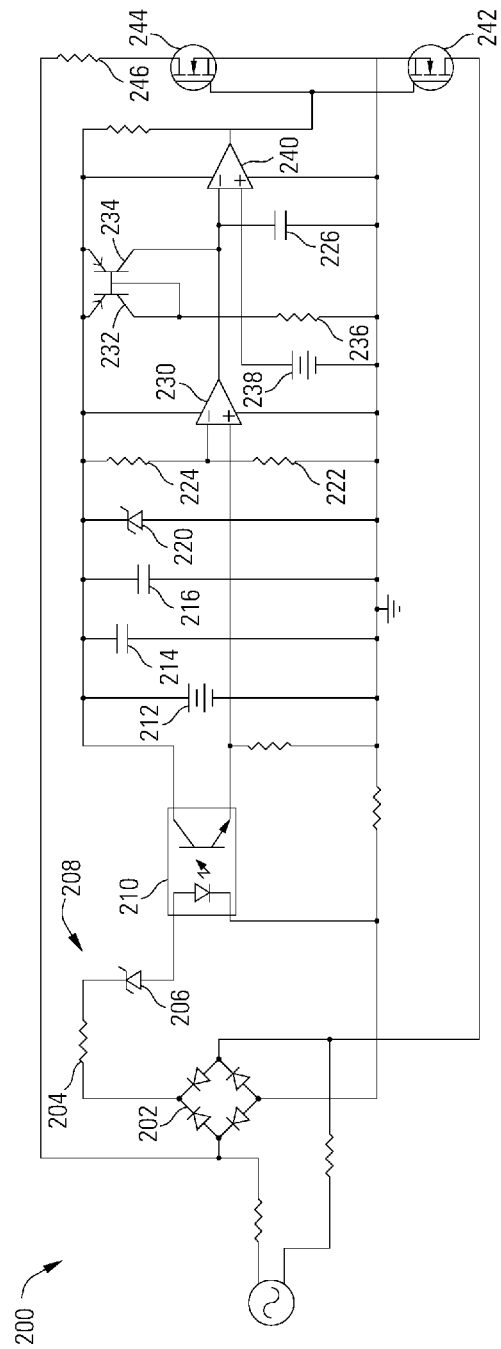
FIG. 2
FIG. 4

DIMMER WITH MOTION AND LIGHT SENSING

CROSS REFERENCE TO RELATED APPLICATIONS

The present application claims priority to (is a non-provisional of) U.S. Pat. App. No. 61/721,601, entitled "Dimmer with Motion and Light Sensing", and filed Nov. 2, 2012 by Sadwick, the entirety of which is incorporated herein by reference for all purposes.

BACKGROUND

Electricity is generated and distributed in alternating current (AC) form, wherein the voltage varies sinusoidally between a positive and a negative value. However, many electrical devices require a direct current (DC) supply of electricity having a constant voltage level, or at least a supply that remains positive even if the level is allowed to vary to some extent. For example, light emitting diodes (LEDs) and similar devices such as organic light emitting diodes (OLEDs) are being increasingly considered for use as light sources in residential, commercial and municipal applications. However, in general, unlike incandescent light sources, LEDs and OLEDs cannot be powered directly from an AC power supply unless, for example, the LEDs are configured in some back to back formation. Electrical current flows through an individual LED easily in only one direction, and if a negative voltage which exceeds the reverse breakdown voltage of the LED is applied, the LED can be damaged or destroyed. Furthermore, the standard, nominal residential voltage level is typically something like 120 V or 240 V, both of which are often higher than may be desired for a high efficiency LED light. Some conversion of the available power may therefore be necessary or highly desired with loads such as an LED light.

SUMMARY

Various embodiments of the present invention provide a dimmer with motion and/or light sensing. In some embodiments, a dimming system includes an alternating current input, a reference crossing detector operable to detect when a signal derived from the alternating current input crosses a reference level, a ramp signal generator operable to generate a ramp signal with a changing voltage, wherein the ramp signal generator is operable to restart the ramp signal based on an output of the reference crossing detector, a switch operable to control a current derived from the alternating current input to a load output, and a switch driver operable to control the switch based at least in part on the ramp signal.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

FIG. 1 is a diagram of a dimmer circuit in accordance with some embodiments of the present invention;

FIG. 2 is a schematic diagram of a dimmer circuit in accordance with some embodiments of the present invention;

FIG. 4 is a diagram of a dimmer reference source with photosensor input in accordance with some embodiments of the present invention;

DETAILED DESCRIPTION OF THE INVENTION

Figure 3:
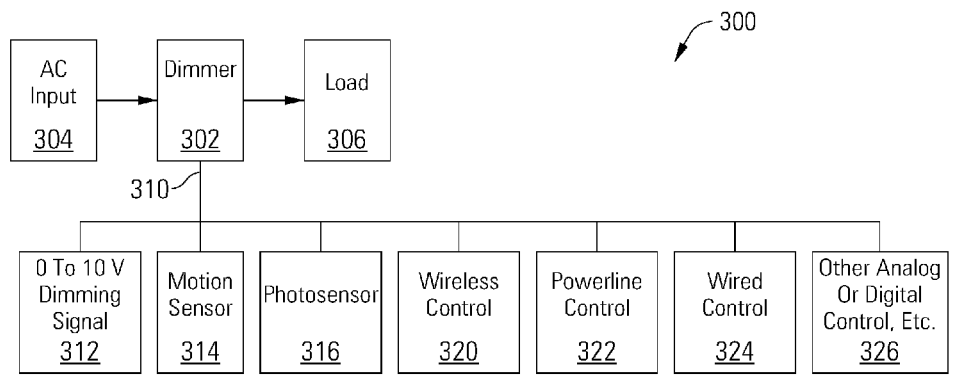
FIG. 3 is a diagram of a dimmer circuit with multiple controllers in accordance with some embodiments of the present invention.

A dimmer for LED drivers and other types of lighting sources is disclosed herein that can be used to provide power for lights such as LEDs of any type, including organic LEDs (OLEDs), as well as other loads, including but not limited to, fluorescent lamps (FLs) including, and also not limited to, compact fluorescent lamps (CFLs), energy efficient FLs, cold cathode FLs (CCFLs), incandescent lamps, etc. The inventions disclosed herein are not limited to the example circuits and applications illustrated, and may be adapted to use with, for example but not limited to, the circuits and applications disclosed in U.S. Patent Application 61/646,289 filed May 12, 2012 for a "Current Limiting LED Driver", and in U.S. Pat. No. 8,148,907 issued Apr. 3, 2012 for a "Dimmable Power Supply", which are incorporated herein by reference for all purposes.

Many dimmers currently available cause and produce flicker, flashing and other undesirable effects when used with, for example, LED lighting and LED lighting drivers. In addition, it is often difficult to dim to very low levels (i.e., deep dimming) with Triac dimmers. In certain cases there is not symmetry in the turn on and turn off characteristics. The behavior of many dimmers, including Triac dimmers, are often also influenced by the impedance of the AC lines and due to, for example, other electrical devices and apparatus on the AC lines. Although dimmers exist that do not use triacs as the dimming elements and, instead, for example, use transistors and can be of either the forward type (i.e., Triac waveform like—turning on after zero crossings depending on the dimming level) or the reverse type (i.e., turning on at zero crossings and then turning off depending on the dimming level), these dimmers are often expensive and have other limitations.

Dimming of lighting is important for numerous reasons and aspects including energy efficiency and meeting the needs of the users under and in various applications. Although there exist numerous dimmers for use with alternating current (AC) sources of power including many based on the use of Triacs to form the active component of the dimmer, dimmers based on Triacs often have negative performance aspects associated the physical principles that underlie, dictate and control the behavior of the Triacs including the need for a minimum trigger current and holding current.

Turning to FIG. 1, an example simplified block diagram depicts a dimming system 100 in accordance with some embodiments of the present invention. Power for the dimming system 100 is derived from an AC input 102 and converted in a power supply 104 to a DC rail 106. In other embodiments, the dimming system 100 may be operated directly from a DC power source, an AC power source, or any suitable power source including alternative power sources. The power supply 104 can provide power for the load 110 and/or for various components of the dimming system 100, such as, but not limited to, various electronics, sensors, detectors, controls, monitors, interfaces, etc. The power supply 104 can be any suitable power source including but not limited to linear regulators and/or switching power supplies and regulators, transformers, including, but not limited to, forward converters, flyback converters, buck-boost, buck, boost, boost-buck, cuk, etc.

A zero detection circuit 112 detects when an alternating current from AC input 102 crosses a threshold, such as zero volts. In general, the zero detection circuit 112 is an embodiment of a reference crossing detector that detects when the alternating current signal crosses a reference level, for example when the changing voltage or current crosses a reference level such as, but not limited to, zero volts or amps. A zero crossing signal 114 from zero detection circuit 112 is used to time, trigger, restart etc. a ramp signal 116 generated by a ramp generator circuit 120. The ramp signal 116 thus restarts as controlled by the zero detection circuit 112, with the voltage of the ramp signal 116 then ramping up or increasing over time.

A switch drive circuit 120 controls a switching element 122, either passing or blocking current from DC rail 106 to a load 110. For example, in some embodiments, switch drive circuit 120 compares the ramp signal 116 with a reference or control signal 124, opening and closing switching element(s) 122 based on whether the ramp signal 116 is greater or less than control signal 124. The dimming system 100 can be used to supply power to any type of load 110.

Turning to FIG. 2, an example simplified circuit implementation of a dimming system 200 is depicted in accordance with some embodiments of the invention. In the dimming system 200, rectifier or diode bridge 202, resistor 204, diode 206 and optocoupler/optoisolator 210 form a zero detection circuit 208 suitable for operation in the frequency range of 47 Hz to 63 Hz and, of course, to lower frequencies and practical useful higher frequencies. Not shown but represented by a voltage source, V3, is the power supply to power the circuit and associated electronics, sensor, detectors, controls, monitors, interfaces, etc. Capacitors 214, 216 and Zener diode 220 may typically form part of an example power source for the present invention. The power source for the present invention can be any suitable power source including but not limited to linear regulators and/or switching power supplies and regulators, transformers, including, but not limited to, forward converters, flyback converters, buck-boost, buck, boost, boost-buck, cuk, etc. Note that, although the example zero detector circuit 208 is shown attached to the DC side of the diode bridge 202, other embodiments of the present invention can use dual/AC opto-couplers/opto-isolators/etc., coils, transformers, windings, etc. The present invention is not limited to the choices discussed above and any suitable circuit, topology, design, implementation, method, approach, etc. may be used with the present invention. In addition the present invention is extremely well suited for use in both manual and automated/automatic applications including applications that utilize remote control and monitoring.

Resistors 222, 224 in FIG. 2 are for illustration purposes and form a voltage divider to provide a reference voltage for the zero detector. The present invention can be adjusted for, for example, 60 Hz or 50 Hz operation and can be selected by a number of methods including fixed, switch-selectable, automatic, auto-detect, manually set, auto-set, fixed/set for 50 Hz operation, fixed/set for 60 Hz operation, etc. Many of the embodiments of the present invention may operate in a variety of different environments and do not need to have the input frequency set for operation. Although two passive elements are shown, in general any number of resistors and/or capacitors, N, where N is equal to or greater than 1, can be used for the present invention. In addition, other implementations and embodiments of the present invention can be realized without the direct use of capacitors such as 226.

As mentioned above resistors 222, 224 form a voltage divider which is used as a reference to comparator 230. Comparator 230 in conjunction with transistors 232, 234 and resistor 236 and capacitor 226 attached to the output of the comparator 230 allow a momentary negative going pulse from the zero detector 208 to occur at the negative input of comparator 230 resulting in the output of comparator 230 resetting and going to zero volts after which the output of comparator 230 rises in a linear voltage ramp dependent mode, for example, on resistor 236 and capacitor 226 in the example embodiment shown. Notably, resistor 236 could consist of a single resistor or any number of resistors in series and/or parallel; capacitor 226 could consist of a single capacitor or any number of capacitors in parallel and/or series. In a typical embodiment, resistor 236 and capacitor 226 may each be a single element/component.

For the forward dimmer operation, the output of comparator 230 is fed to the positive input of comparator 240; the output of comparator 240 goes and stays high when the voltage at the positive input is higher than the voltage at the negative input with the voltage at the negative input being set by the control input voltage 238. The output of comparator 240 is fed to a suitable switch or switching circuit such as the example one consisting of source-to-source common gate connected metal oxide semi-conductor field effect transistors (MOSFETs) 242 and 244 as illustrated in FIG. 2.

For the reverse dimmer, the output of comparator 230 is fed to the negative input of comparator 240; the output of comparator 240 goes and stays high when the voltage at the positive input is higher than the voltage at the negative input with the voltage at the positive input being set by the control input voltage 238. The output of comparator 240 goes and stays low when the voltage at the negative input of comparator 240 is higher than the voltage of the positive input to comparator 240. The output of comparator 240 is fed to a suitable switch or switching circuit such as the one consisting of source-to-source common gate connected metal oxide semi-conductor field effect transistors (MOSFETs) 242 and 244 as illustrated in FIG. 2.

Although MOSFETs were used and illustrated in FIG. 2, any suitable switch including any suitable transistor including, but not limited to, bipolar junction transistor (BJT), field effect transistor (FET), junction FET (JFET), unijunction FET (UFET), metal emitter semiconductor (MESFET), Darlington transistors, etc. can be used to control current to load 246.

The switch circuit may contain other elements and components, including, for example, but not limited to, diodes and diode bridges.

Although the example embodiments shown in FIG. 2 and discussed above used comparators, the choice of comparators in these example embodiments should not be construed to be limiting in any way or form; other choices including, but not limited to, op amps, difference amplifiers, difference circuits, etc. can be used with and for the present invention.

FIG. 3 provides a simple block diagram 300 of certain embodiments of the present invention showing some of the various and diverse controls and monitors that can be used and work with the present invention. Dimmer circuit 302 receives power from AC input 304 and dimmably supplies power to load 306. Dimmer circuit 302 receives dimming control signal(s) 310 from one or more controllers, such as, but not limited to, a 0 to 10 V dimming signal 312, motion sensor 314, photosensor 316, wireless control 320, powerline control 322, wired control 324, and/or other analog or digital controls 326. Motion sensor 314 can be used to cause dimmer circuit 302 to change from a dimmed state to a full on state, or from an off state to a dimmed or full on state, etc. In some embodiments, dimmer circuit 302 is triac-based.

FIG. 4 shows one simple example of an embodiment of a digital control 400 for the photodetector/light dimming control. Should the light level indicated by a photosensor signal 402 be below the dimming set point 404, the op-amp or comparator 406 will generate a control signal 410 that will set the light source to the dimming set point 404. Should the photodetector/light level 402 be above the dimming level set point 404, then the dimmed (or full on) light will be set to turn off. The control signal 410 is used in some embodiments to supply the reference signal 238 for comparator 240 of FIG. 2. Thus, the dimming system can be caused to limit or turn off the current to the load if the ambient light is already as bright as requested by the dimming set point 404. This can be used to achieve a desired light level, while saving power if the ambient light, for example from sunlight through windows, is already sufficient.

Figures 5, 7:
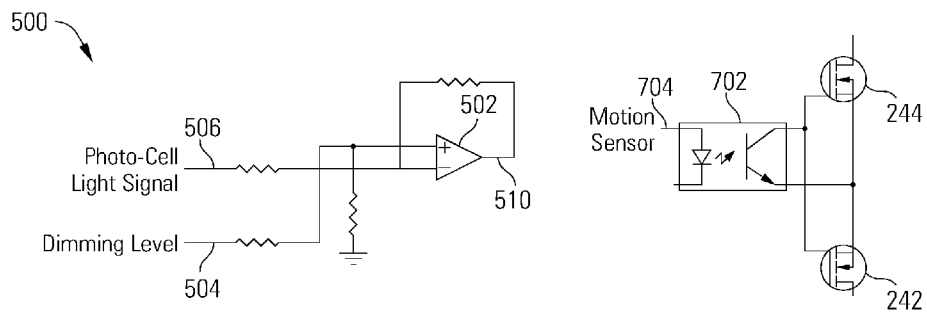
FIG. 5 is a schematic diagram of an analog dimmer reference source with photosensor input in accordance with some embodiments of the present invention.
FIG. 7 depicts a schematic diagram of an opto-isolator coupled motion sensor input for a dimmer in accordance with some embodiments of the present invention.

FIG. 5 shows one simple example embodiment of an analog control 500 that uses a difference amplifier 502 to produce the difference between the dimming set level 504 and the photodetector/light level signal 506 and applies the difference signal 510 to the control input 238 of comparator 240 in FIG. 2 to set the phase angle control of the dimmer.

Figures 6, 8:
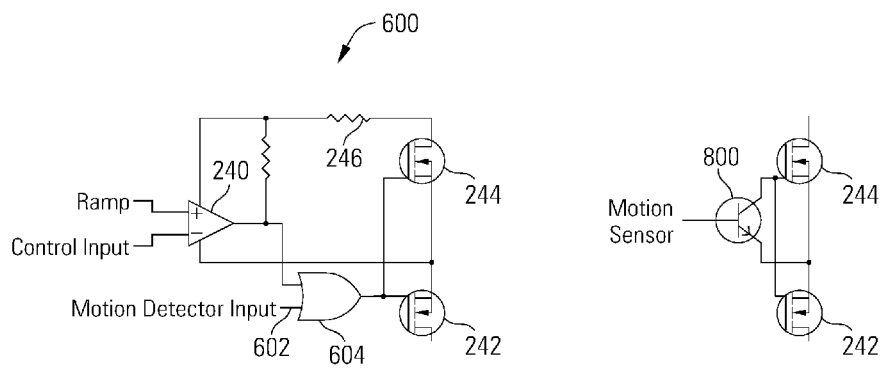
FIG. 6 depicts a schematic diagram of a dimmer controller with motion detector input in accordance with some embodiments of the present invention.
FIG. 8 depicts a schematic diagram of a transistor coupled motion sensor input for a dimmer in accordance with some embodiments of the present invention.

FIG. 6 shows one simple example embodiment of motion detector signal 602 that produces a full on response from the present invention. A partial example embodiment circuit is shown in FIG. 6 which has been modified with the addition of an OR gate 604. When the output of the motion detector/sensor goes high, the respective OR gate input 602 produces a high output that drives switching transistors 242, 244 to turn on resulting in a full on condition for the load 246 for the duration of the motion detector signal 602 regardless of the state or condition of the dimming signal and/or the photosensor/photodetector input for this particular embodiment of the present invention. Other embodiments can be readily constructed and implemented that permit, for example, the dimming level to be sent by the activation signal from the motion detector using analog, digital and/or pulse width modulation (PWM) approaches, methods and techniques. Other embodiments can allow the photodetector(s)/photosensor(s) signals to set the dimming level and/or override the motion detector signal, etc.

The motion detector/sensor may be powered by any suitable source, such as but not limited to a power source derived from the input voltage to the dimming circuit, or from other sources such as a battery, solar power source, mechanical or thermal power source, etc, or any combination of these, etc. In addition, the sensors, such as, but not limited to, motion, sound, thermal, mechanical, voice activated, motion, light, photodetection, etc., can be remote from the present invention and either powered directly or indirectly by the present invention or remotely powered via battery or batteries, battery charger(s), AC or DC power, wired or wireless power, electrical, mechanical, light, photo, solar cell, photovoltaic, vibrational, RF, inductive, etc. or a combination of these. The above is meant to be illustrative and should not be construed as limiting in any way or form.

Various embodiments of a dimmer with motion and/or light sensing may also incorporate soft start turn on and/or soft start turn off, gradually adjusting the dimming setting in response to motion detection and/or light sensing. The soft start options may further be programmable, configurable or controllable, for example but not limited to by switch selection or by remote configuration commands.

FIG. 7 shows another example of a method to control the on/off/dimming state of the present invention. The partial circuit shown in FIG. 7 can be configured and used to turn off the output switching transistors 242, 244 illustrated in FIG. 7 by having the output of the optocoupler/optoisolator 702 set to effectively short the gate voltage of the output transistors (which in this example correspond to Q2 and Q4 in the previous figures and are two back-to-back MOSFETs with the gates tied together and the sources tied together). By applying a signal either directly or, for example, modified by other circuitry from the motion sensor, the motion detect signal 704 can be used to turn off the input to the opto-coupler/opto-isolator and to allow the current/set dimming level to be applied to the output switching transistors and, therefore, to the connected load. Thus, when motion has not been detected, the output current is turned off and the light is extinguished. A time delay can be included so that the light remains on for a given duration after motion is no longer detected, although the light can be turned on instantly when motion is detected.

FIG. 8 shows another example where the opto-coupler/opto-isolator 702 of FIG. 7 has been replaced with a transistor 800. Although an NPN BJT is shown in FIG. 8, in general, any type of transistor or vacuum tube or other similarly functioning device can be used including, but not limited to, MOSFETs, JFETs, GANFETs, depletion or enhancement FETs, N and/or P FETs, CMOS, PNP BJTs, triodes, Darlington transistors etc. which can be made of any suitable material and configured to function and operate to provide the performance, for example, described above. In addition, other types of devices and components can be used including, but not limited to transformers, transformers of any suitable type and form, coils, level shifters, digital logic, analog circuits, analog and digital, mixed signals, microprocessors, microcontrollers, FPGAs, CLDs, PLDs, comparators, op amps, instrumentation amplifiers, and other analog and digital components, circuits, electronics, systems etc.

For all of the example figures shown, the above analog and/or digital components, circuits, electronics, systems etc. are, in general, applicable and usable in and for the present invention.

The example embodiments shown in FIGS. 1 through 8 are merely intended to provide some illustrations of the present invention and not limiting in any way or form for the present invention.

Figure 9:
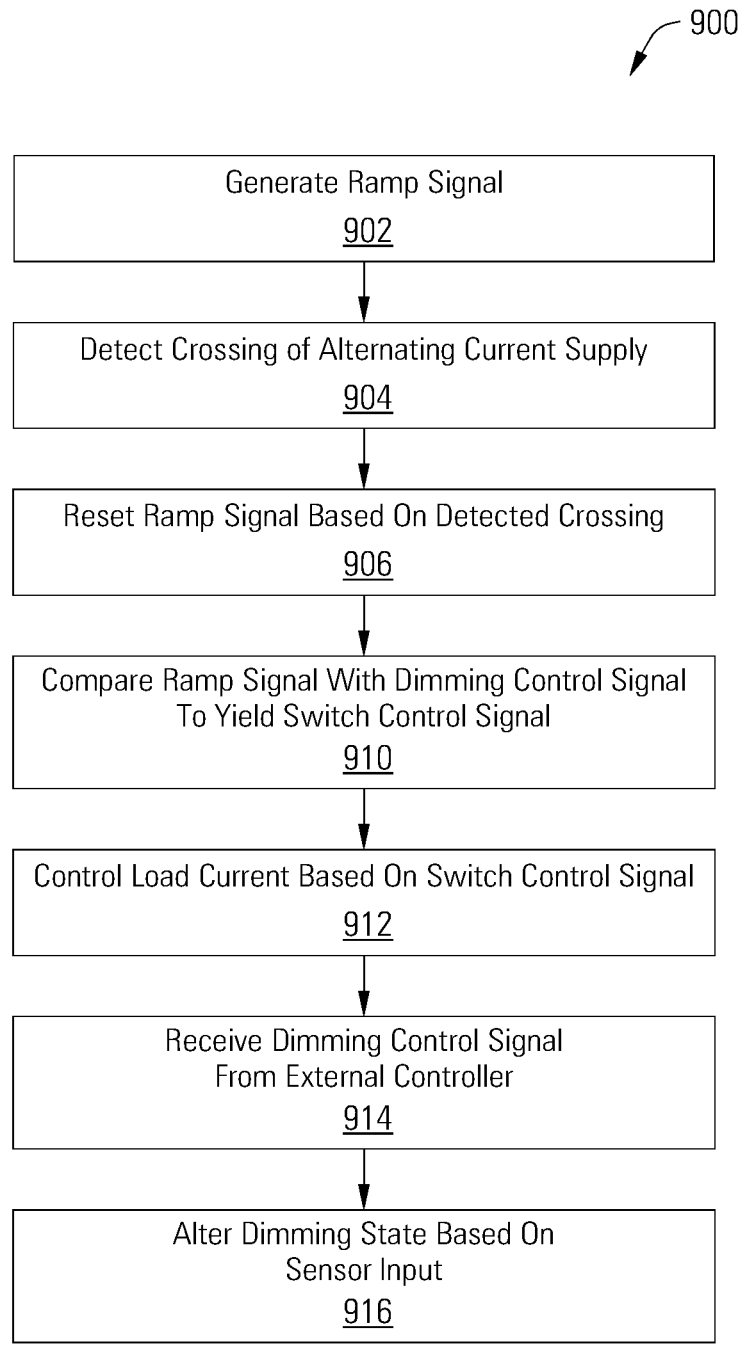
FIG. 9 is a flow diagram of an operation to dim a load output in accordance with some embodiments of the present invention.

Turning to FIG. 9, an example operation for dimmably supplying power to a load is shown in flow chart 900 accordance with some embodiments of the present invention. A ramp signal is generated (block 902), using any suitable method or circuit. In some embodiments, the ramp signal is a substantially linearly increasing voltage. A crossing detection is performed for an alternating current supply (block 904), for example detecting when the input voltage crosses zero or any other particular voltage level. The ramp signal is reset based on the crossing detection (block 906). The ramp signal is compared with a dimming control signal to yield a switch control signal (block 910). Current to the load is controlled based on the switch control signal (block 912). The dimming control signal is received from an external controller (block 914), such as, but not limited to, a 0 to 10 V dimming signal, motion sensor, photosensor, wireless control, powerline control, wired control, and/or other analog or digital controls, etc. The dimming state is altered based on sensor input (block 916), for example, by setting the dimming state to full on in response to motion detected by a motion sensor, or by limiting or turning off the dimming level in response to a photosensor. Notably, the elements of the operation of flow chart 900 can be performed in any order, and some or all of the elements can be performed in parallel or simultaneously.

Using digital and/or analog designs and/or microcontrollers and/or microprocessors any and all practical combinations of control, sequencing, levels, etc., some examples of which are listed below for the present invention, can be realized.

In addition to the examples illustrated in the figures including in FIG. 3, a potentiometer or similar device such as a variable resistor may be used to control the dimming level. Such a potentiometer may be connected across a voltage such that the wiper of the potentiometer can swing from minimum voltage (i.e., full dimming) to maximum voltage (i.e., full light). Often the minimum voltage will be zero volts which may correspond to full off and, for the example embodiments shown here, the maximum will be equal to or approximately equal to the voltage on the negative input of the comparator 240.

Current sense methods including resistors, current transformers, current coils and windings, etc. can be used to measure and monitor the current of the present invention and provide both monitoring and protection.

In addition to dimming by adjusting, for example, a potentiometer, the present invention can also support all standards, ways, methods, approaches, techniques, etc. for interfacing, interacting with and supporting, for example, 0 to 10 V dimming by, for example, replacing the 222,224 voltage divider in FIGS. 1 and 2 with a suitable reference voltage that can be remotely set or set via an analog or digital input such as illustrated in patent application 61/652,033 filed on May 25, 2012, for a "Dimmable LED Driver", which is incorporated herein by reference for all purposes.

The present invention supports all standards and conventions for 0 to 10 V dimming or other dimming techniques. In addition the present invention can support, for example, overcurrent, overvoltage, short circuit, and over-temperature protection. The present invention can also measure and monitor electrical parameters including, but not limited to, input current, input voltage, power factor, apparent power, real power, inrush current, harmonic distortion, total harmonic distortion, power consumed, watthours (WH) or killowatt hours (kWH), etc. of the load or loads connected to the present invention. In addition, in certain configurations and embodiments, some or all of the output electrical parameters may also be monitored and/or controlled directly for, for example, LED drivers and FL ballasts. Such output parameters can include, but are not limited to, output current, output voltage, output power, duty cycle, PWM, dimming level(s), etc.

In place of the potentiometer, an encoder or decoder can be used. The use of such also permits digital signals to be used and allows digital signals to either or both locally or remotely control the dimming level and state. A potentiometer with an analog to digital converter (ADC) or converters (ADCs) could also be used in many of such implementations of the present invention.

The present invention can be used and configured in numerous and diverse ways including, but not limited to:

As a dimmer with a motion sensor input such that the motion sensor, when motion is detected and the motion sensor is activated, sets the dimmer to full on.

As a dimmer with a motion sensor input such that the motion sensor, when motion is detected and the motion sensor is activated, sets the dimmer to full on output.

As a dimmer with a motion sensor input such that the motion sensor, when motion is detected and the motion sensor is activated, sets the dimmer from the dimming level to full on.

As a dimmer with a motion sensor input such that the motion sensor, when motion is detected and the motion sensor is activated, sets the dimmer from full off to full on.

As a dimmer with a motion sensor input such that the motion sensor, when motion is detected and the motion sensor is activated, sets the dimmer from a minimum dimming level to full on.

As a dimmer with a motion sensor input such that the motion sensor, when motion is detected and the motion sensor is activated, sets the dimmer from a minimum dimming level to the current dimming level.

As a dimmer with a motion sensor input such that the motion sensor, when motion is detected and the motion sensor is activated, sets the dimmer from a minimum dimming level to the set dimming level.

As a dimmer with a motion sensor input such that the motion sensor, when motion is detected and the motion sensor is activated, sets the dimmer from a minimum dimming level to the specified dimming level.

As a dimmer with a motion sensor input such that the motion sensor, when motion is detected and the motion sensor is activated, sets the dimmer from the current dimming level to another dimming level.

As a dimmer with a motion sensor input such that the motion sensor, when motion is detected and the motion sensor is activated, sets the dimmer from the current dimming level to a higher dimming level.

As a dimmer with a motion sensor input such that the motion sensor, when motion is detected and the motion sensor is activated, sets the dimmer from full off to the current dimming level.

As a dimmer with a motion sensor and photosensor/photodetector input such that the motion sensor, when motion is detected and the motion sensor is activated, sets the dimmer from a minimum dimming level to the current dimming level or the dimming level set by the photosensor/photodetector whichever is lower.

As a dimmer with a motion sensor and photosensor/photodetector input such that the motion sensor, when motion is detected and the motion sensor is activated, sets the dimmer from a minimum or full off to the current dimming level or the dimming level set by the photosensor/photodetector.

As a dimmer with a motion sensor and photosensor/photodetector input such that the motion sensor, when motion is detected and the motion sensor is activated, sets the dimmer from a minimum dimming level to the current dimming level or the dimming level set by the photosensor/photodetector.

As a dimmer with a motion sensor and photosensor/photodetector input such that the motion sensor, when motion is detected and the motion sensor is activated, sets the dimmer from full off to the current dimming level or the dimming level set by the photosensor/photodetector.

As a dimmer with a motion sensor and photosensor/photodetector input such that the motion sensor, when motion is detected and the motion sensor is activated, sets the dimmer from the current dimming level or the dimming level set by the photosensor/photodetector to full on.

As a dimmer with a motion sensor and photosensor/photodetector input such that the motion sensor, when motion is detected and the motion sensor is activated, sets the dimmer from the current dimming level or the dimming level set by the photosensor/photodetector to the same or another level of dimming depending on the photodetector signal.

As a dimmer with a motion sensor and photosensor/photodetector input such that the motion sensor, when motion is detected and the motion sensor is activated, ignores the motion sensor depending on the photosensor/photodetector signal.

As a dimmer with a motion sensor and photosensor/photodetector input such that the motion sensor, when motion is detected and the motion sensor is activated, works in conjunction with the photosensor/photodetector to set the output level.

As an on/off switch with a motion sensor and photosensor/photodetector input such that the motion sensor, when motion is detected and the motion sensor is activated, sets the switch from full off to the current dimming level or the dimming level set by the photosensor/photodetector.

As an on/off switch with a motion sensor and photosensor/photodetector input such that the motion sensor, when motion is detected and the motion sensor is activated, sets the switch from full off to full on.

The above examples and figures are merely meant to provide illustrations of the present and should not be construed as limiting in any way or form for the present invention.

In addition to the examples above and any combinations of the above examples, the present invention can have multiple dimming levels set by the dimmer in conjunction with the motion sensor and photosensor/photodetector and/or other control and monitoring inputs including, but not limited to, analog (e.g., 0 to 10 V, 0 to 3 V, etc.), digital (RS232, RS485, USB, DMX, SPI, SPC, UART, other serial interfaces, etc.), a combination of analog and digital, analog-to-digital converters and interfaces, digital-to-analog converters and interfaces, wired, wireless (i.e., RF, WiFi, ZigBee, Zwave, ISM bands, 2.4 GHz, etc.), powerline (PLC) including X-10, Insteon, HomePlug, etc.), etc. The photocell and/or motion sensor can be powered by any type of source or sources either directly or indirectly from the present invention or independently via wired and/or wireless means, approaches and source(s) and can also use batteries or the likes that can be stand-alone or recharged by any means, methods and approaches. The photocell can provide analog and/or digital signals, information, voltages, etc. The motion sensor can provide analog and/or digital signals, information, voltages, etc.

The present invention is highly configurable and words such as current, set, specified, etc. when referring to, for example, the dimming level or levels, may have similar meanings and intent or may refer to different conditions, situations, etc. For example, in a simple case, the current dimming level may refer to the dimming level set by, for example, a control voltage from a digital or analog source including, but not limited to digital signals, digital to analog converters (DACs), potentiometer(s), encoders, etc.

The present invention can have embodiments and implementations that include manual, automatic, monitored, controlled operations and combinations of these operations. The present invention can have switches, knobs, variable resistors, encoders, decoders, push buttons, scrolling displays, cursors, etc. The present invention can use analog and digital circuits, a combination of analog and digital circuits, microcontrollers and/or microprocessors including, for example, DSP versions, FPGAs, CLDs, ASICs, etc. and associated components including, but not limited to, static, dynamic and/or non-volatile memory, a combination and any combinations of analog and digital, microcontrollers, microprocessors, FPGAs, CLDs, etc. Items such as the motion sensor(s), photodetector(s)/photosensor(s), microcontrollers, microprocessors, controls, displays, knobs, etc. may be internally located and integrated/incorporated into the dimmer or externally located. The switches/switching elements can consist of any type of semiconductor and/or vacuum technology including but not limited to triacs, transistors, vacuum tubes, triodes, diodes or any type and configuration, pentodes, tetrodes, thyristors, silicon controlled rectifiers, diodes, etc. The transistors can be of any type(s) and any material(s)—examples of which are listed below and elsewhere in this document.

The dimming level(s) can be set by any method and combinations of methods including, but not limited to, motion, photodetection/light, sound, vibration, selector/push buttons, rotary switches, potentiometers, resistors, capacitive sensors, touch screens, wired, wireless, PLC interfaces, etc. In addition, both control and monitoring of some or all aspects of the dimming, motion sensing, light detection level, sound, etc. can be performed for and with the present invention.

Other embodiments can use other types of comparators and comparator configurations, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices (CLDs), field programmable gate arrays (FPGAs), etc.

The dimmer for dimmable drivers may use and be configured in continuous conduction mode (CCM), critical conduction mode (CRM), discontinuous conduction mode (DCM), resonant conduction modes, etc., with any type of circuit topology including but not limited to buck, boost, buck-boost, boost-buck, cuk, SEPIC, flyback, forward-converters, etc. The present invention works with both isolated and non-isolated designs including, but not limited to, buck, boost-buck, buck-boost, boost, cuk, SEPIC, flyback and forward-converters. The present invention itself may also be non-isolated or isolated, for example using a tagalong inductor or transformer winding or other isolating techniques, including, but not limited to, transformers including signal, gate, isolation, etc. transformers, optoisolators, optocouplers, etc.

The present invention may include other implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

The present invention can also incorporate at an appropriate location or locations one or more thermistors (i.e., either of a negative temperature coefficient [NTC] or a positive temperature coefficient [PTC]) to provide temperature-based load current limiting.

As an example, when the temperature rises at the selected monitoring point(s), the phase dimming of the present invention can be designed and implemented to drop, for example, by a factor of, for example, two. The output power, no matter where the circuit was originally in the dimming cycle, will also drop/decrease by a some factor. Values other than a factor of two (i.e., 50%) can also be used and are easily implemented in the present invention by, for example, changing components of the example circuits described here for the present invention. As an example, a resistor change would allow and result in a different phase/power decrease than a factor of two. The present invention can be made to have a rather instant more digital-like decrease in output power or a more gradual analog-like decrease, including, for example, a linear decrease in output phase or power once, for example, the temperature or other stimulus/signal(s) trigger/activate this thermal or other signal control.

In other embodiments, other temperature sensors may be used or connected to the circuit in other locations. The present invention also supports external dimming by, for example, an external analog and/or digital signal input. One or more of the embodiments discussed above may be used in practice either combined or separately including having and supporting both 0 to 10 V and digital dimming. The present invention can also have very high power factor. The present invention can also be used to support dimming of a number of circuits, drivers, etc. including in parallel configurations. For example, more than one driver can be put together, grouped together with the present invention. Groupings can be done such that, for example, half of the dimmers are forward dimmers and half of the dimmers are reverse dimmers. Again, the present invention allows easy selection between forward and reverse dimming that can be performed manually, automatically, dynamically, algorithmically, can employ smart and intelligent dimming decisions, artificial intelligence, remote control, remote dimming, etc.

The circuit of FIGS. 1 and 2 may be used in conjunction with dimming to provide thermal control or other types of control to, for example, a dimming LED driver. For example, the circuit of FIGS. 1 and 2 or variations thereof may also be adapted to provide overvoltage or overcurrent protection, short circuit protection for, for example, a dimming LED driver, CFL, incandescent bulb, etc., or to override and cut the phase and power to the dimming LED driver(s) based on any arbitrary external signal(s) and/or stimulus. The present invention can also be used for purposes and applications other than lighting—as an example, electrical heating where a heating element or elements are electrically controlled to, for example, maintain the temperature at a location at a certain value. The present invention can also include circuit breakers including solid state circuit breakers and other devices, circuits, systems, etc. that limit or trip in the event of an overload condition/situation. The present invention can also include, for example analog or digital controls including but not limited to wired (i.e., 0 to 10 V, RS 232, RS485, IEEE standards, SPI, I2C, other serial and parallel standards and interfaces, etc.), wireless, powerline, etc. and can be implemented in any part of the circuit for the present invention. The present invention can be used with a buck, a buck-boost, a boost-buck and/or a boost, flyback, or forward-converter design, topology, implementation, etc.

A dimming voltage signal, VDIM, which represents a voltage from, for example but not limited to, a 0-10 V Dimmer can be used with the present invention; when such a VDIM signal is connected, the output as a function time or phase angle (or phase cut) will correspond to the inputted VDIM.

Other embodiments can use comparators, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices, field programmable gate arrays, etc.

The present invention includes implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

The present invention, although described primarily for motion and light/photodetection control, can and may also use other types of stimuli, input, detection, feedback, response, etc. including but not limited to sound, vibration, frequencies above and below the typical human hearing range, temperature, humidity, pressure, light including below the visible (i.e., infrared, IR) and above the visible (i.e., ultraviolet, UV), radio frequency signals, combinations of these, etc. For example, the motion sensor may be replaced or augmented with a sound sensor (including broad, narrow, notch, tuned, tank, etc. frequency response sound sensors) and the light sensor could consist of one or more of the following: visible, IR, UV, etc. sensors. In addition, the light sensor(s)/detector(s) could also be replaced or augmented by thermal detector(s)/sensor(s), etc.

The example embodiments disclosed herein illustrate certain features of the present invention and not limiting in any way, form or function of present invention. The present invention is, likewise, not limited in materials choices including semiconductor materials such as, but not limited to, silicon (Si), silicon carbide (SiC), silicon on insulator (SOI), other silicon combination and alloys such as silicon germanium (SiGe), etc., diamond, graphene, gallium nitride (GaN) and GaN-based materials, gallium arsenide (GaAs) and GaAs-based materials, etc. The present invention can include any type of switching elements including, but not limited to, field effect transistors (FETs) of any type such as metal oxide semiconductor field effect transistors (MOSFETs) including either p-channel or n-channel MOSFETs of any type, junction field effect transistors (JFETs) of any type, metal emitter semiconductor field effect transistors, etc. again, either p-channel or n-channel or both, bipolar junction transistors (BJTs) again, either NPN or PNP or both, Darlington transistors, heterojunction bipolar transistors (HBTs) of any type, high electron mobility transistors (HEMTs) of any type, unijunction transistors of any type, modulation doped field effect transistors (MODFETs) of any type, etc., again, in general, n-channel or p-channel or both, vacuum tubes including diodes, triodes, tetrodes, pentodes, etc. and any other type of switch, etc.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A dimming system comprising:
    an alternating current input;
    a reference crossing detector operable to detect when a signal derived from the alternating current input crosses a reference level;
    a ramp signal generator operable to generate a ramp signal with a changing voltage, wherein the ramp signal generator is operable to restart the ramp signal based on an output of the reference crossing detector;
    a switch operable to control a current derived from the alternating current input to a load output;
    a switch driver operable to control the switch based at least in part on the ramp signal, and
    a difference amplifier operable to generate a difference between the ramp signal and an input from a light sensor, wherein the switch driver is operable to control the switch based at least in part on the difference.

2. The dimming system of claim 1, wherein the switch driver is operable to compare the ramp signal with a dimming level signal and to open and close the switch based at least in part on the comparison.

3. The dimming system of claim 2, wherein the dimming level signal is based on a command from an external dimming controller.

4. The dimming system of claim 3, wherein the external dimming controller comprises a 0 to 10 volt dimming signal.

5. The dimming system of claim 3, wherein the external dimming controller comprises a controller selected from a group consisting of: a wireless controller and a wired controller.

6. The dimming system of claim 3, wherein the external dimming controller comprises a powerline controller.

7. The dimming system of claim 1, wherein the switch driver is operable to receive an input from a light sensor and to control the current derived from the alternating current input to the load output based at least in part on the input from the light sensor.

8. The dimming system of claim 1, wherein the switch driver is operable to compare the ramp signal with a dimming level signal and to open and close the switch based at least in part on the comparison, further comprising a comparator operable to compare a dimming set point with an input from a light sensor to yield the dimming level signal.

9. The dimming system of claim 8, wherein the comparator is operable to set the dimming level signal at the dimming set point when the input from the light sensor is less than the dimming set point.

10. The dimming system of claim 8, wherein the comparator is operable to turn off the dimming level signal when the input from the light sensor is greater than the dimming set point.

11. The dimming system of claim 1, wherein the switch driver is operable to receive an input from a motion sensor and to control the current derived from the alternating current input to the load output based at least in part on the input from the motion sensor.

12. The dimming system of claim 11, wherein the switch comprises a pair of transistors having a common gate and being connected source to source, and wherein the switch driver is operable to connect the common gate to the common source based upon a lack of motion detected by the motion sensor.

13. The dimming system of claim 12, wherein the switch driver comprises an optocoupler operable to connect the common gate to the common source.

14. The dimming system of claim 12, wherein the switch driver comprises a transistor operable to connect the common gate to the common source.

15. The dimming system of claim 11, wherein the switch comprises a pair of transistors having a common gate and being connected source to source, and wherein the switch driver is operable to compare the ramp signal with a dimming level signal to yield a dimming control signal, and wherein the switch driver comprises an OR gate having as input the dimming control signal and the input from the motion sensor, wherein the switch driver is operable to turn the switch full on when motion is detected and to control the switch based on the dimming controls signal when motion is not detected.

16. The dimming system of claim 1, wherein the system is implemented as an integrated circuit.

17. A method of dimmably supplying a load current, comprising:
    generating a ramp signal, including restarting the ramp signal when a signal derived from an alternating current supply crosses a threshold;
    receiving a 0- to 10 volt dimming control signal from an external controller;
    comparing the ramp signal with the dimming control signal to yield a switch control signal; and
    calculating a difference between the ramp signal and an input from a light sensor and controlling the load current based in part on the difference.

18. The method of claim 17, further comprising controlling the load current based at least in part on a signal from a sensor selected from a group consisting of: a motion sensor and a light sensor.

19. A dimming system comprising:
an alternating current input;
a reference crossing detector operable to detect when a signal derived from the alternating current input crosses a reference level;
a ramp signal generator operable to generate a ramp signal with a changing voltage, wherein the ramp signal generator is operable to restart the ramp signal based on an output of the reference crossing detector;
a switch operable to control a current derived from the alternating current input to a load output; and
a switch driver operable to control the switch based at least in part on the ramp signal, wherein the switch driver is operable to compare the ramp signal with a dimming level signal and to open and close the switch based at least in part on the comparison, further comprising a comparator operable to compare a dimming set point with an input from a light sensor to yield the dimming level signal, wherein the comparator is operable to turn off the dimming level signal when the input from the light sensor is greater than the dimming set point.

* * * * *